(12) United States Patent
Shin

(10) Patent No.: US 11,009,168 B2
(45) Date of Patent: May 18, 2021

(54) BORING SYSTEM HAVING BORING TAP EMBEDDED THEREIN AND BORING METHOD USING THE SAME

(71) Applicant: Young Suk Shin, Sejong-si (KR)

(72) Inventor: Young Suk Shin, Sejong-si (KR)

( * ) Notice: Subject to any disclaimer, the term of this patent is extended or adjusted under 35 U.S.C. 154(b) by 0 days.

(21) Appl. No.: 16/878,681

(22) Filed: May 20, 2020

(65) Prior Publication Data

US 2020/0370698 A1     Nov. 26, 2020

(30) Foreign Application Priority Data

May 20, 2019   (KR) .......................... 10-2019-0058637

(51) Int. Cl.
*F16L 41/06*     (2006.01)

(52) U.S. Cl.
CPC ......... *F16L 41/06* (2013.01); *Y10T 137/6123* (2015.04)

(58) Field of Classification Search
CPC ............................ F16L 41/06; Y10T 137/6123
USPC ........................................................ 137/318
See application file for complete search history.

(56) References Cited

U.S. PATENT DOCUMENTS

| | | | | |
|---|---|---|---|---|
| 3,176,708 A | * | 4/1965 | Shields ................... | F16L 41/04 137/318 |
| 3,756,261 A | * | 9/1973 | Minchhoff .............. | F16L 41/06 137/15.14 |
| 4,922,951 A | * | 5/1990 | Webster .................. | F16L 41/04 137/15.09 |
| 5,901,759 A | * | 5/1999 | Nickens et al. ....... | B09B 3/0058 141/1 |
| 2007/0113895 A1 | * | 5/2007 | Ishikawa et al. ..... | F16L 47/345 137/318 |

FOREIGN PATENT DOCUMENTS

| | | |
|---|---|---|
| JP | 06-323484 A | 11/1994 |
| JP | 2000-161577 A | 6/2000 |
| KR | 100688997 B1 | 2/2007 |
| KR | 100947104 B1 | 3/2010 |
| KR | 10-2010-0100361 A | 9/2010 |

\* cited by examiner

*Primary Examiner* — Kevin L Lee

(74) *Attorney, Agent, or Firm* — U & Cai Intellectual Property (USA) Office

(57) ABSTRACT

Provided are a boring apparatus of a specials tube and a boring method using the same. The specials tube for connecting a primary pipe and another pipe includes a main pipe having one end coupled to an outer surface of the primary pipe and having a length formed outside of the primary pipe in a diameter direction, a branch pipe branched from the main pipe, and a boring tap disposed at the other end of the main pipe, wherein a boring hole is formed on an outer surface of the main pipe by adjusting the boring tap in a state where the main pipe is sealed, whereby leakage of a fluid flowing in the primary pipe to the outside may be prevented during a branching operation of a pipe.

8 Claims, 21 Drawing Sheets

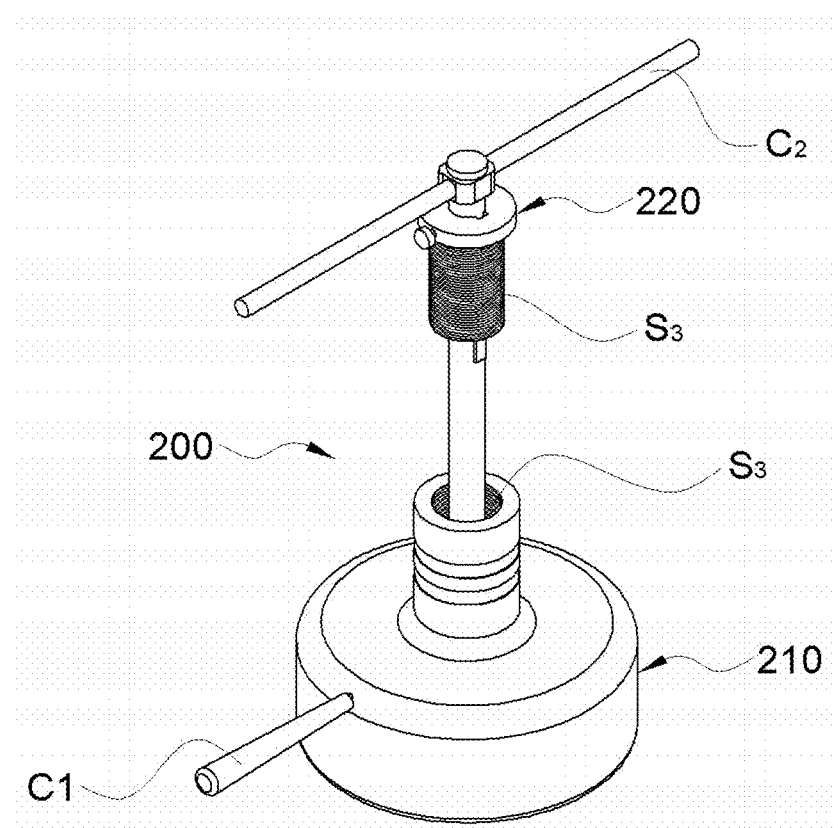

BORING SYSTEM HAVING BORING TAP EMBEDDED THEREIN AND BORING METHOD USING THE SAME

CROSS-REFERENCE TO RELATED APPLICATIONS

This application claims priority under 35 U.S.C. § 119 to Korean Patent Application No. 10-2019-0058637, filed on May 20, 2019, in the Korean Intellectual Property Office, the disclosure of which is incorporated herein by reference in its entirety.

TECHNICAL FIELD

The following disclosure relates to a specials tube having a boring tap embedded therein and a boring method using the same, and more particularly, to a boring apparatus used together with a specials tube that connects one pipe to another pipe and a boring method using the same.

BACKGROUND

In general, when constructing gas pipes, a joint pipe is connected between the gas pipes in order to connect a plurality of gas pipes. At this time, the joint pipe may include specials tubes such as a straight-shaped pipe, a non-linear curved pipe, a T-shaped pipe, and a Y-shaped pipe that connect constant-length pipes so as to extend, which are disclosed Korean Patent Publication No. KR 10-0688997 B1 ("FITTING FOR ELECTRIC FUSION WITH PRESSING DEVICE USINGSCREW" published on Mar. 8, 2007). At this time, the specials tube may be used for various purposes, such as branching of a pipe line or changing of a direction when a gas pipe is initially installed.

Here, in the related art, for additional branching working of a gas pipe that is already installed and has fluid flowing therein, a specials tube is provided to be installed on a side surface of a main pipe as disclosed in Korean Patent Publication No. KR 10-0947104 B1 ("PUNCHING DEVICE" published on Mar. 10, 2010). As the specials tube used at this time, a T-shaped pipe called a service tee is often used.

A branching process of a conventional active pipe will be described as follows with reference to FIG. 1. In the branching working for the conventional active pipe, a branch tee 2 is first fusion-connected onto a main pipe 1. Thereafter, a branch pipe 3 and a gate valve 4 are coupled onto two different openings of the branch tee 2. When the corresponding working is completed, a boring machine 6 is mounted at a point where the gate valve 4 is coupled, and the opening of the gate valve 4 and a boring working using a cutter of the boring machine 6 are then performed. When the boring working is completed, the opening on which the boring machine 6 is mounted is sealed by removing the cutter on the boring machine 6 and mounting a plug adapter 7 instead, and the gate valve 4 and the boring machine 6 are separated from each other, thereby making it possible to provide the fluid of the main pipe 1 to be supplied to the branch pipe 3 through the branch tee 2.

However, since the boring working for the conventional active pipe is accompanied by a process of sealing the opening in the state of being bored on the main pipe, there is a disadvantage that the risk of gas leakage in the corresponding process is high. In particular, in the case of the gas pipe, since high-pressure gas flows therein, there is a problem that the safety of workers on the site may be greatly threatened even if only a part of gas of an ignitable material is leaked.

RELATED ART DOCUMENT

Patent Document

KR 10-0688997 B1 ("FITTING FOR ELECTRIC FUSION WITH PRESSING DEVICE USING SCREW") published on Mar. 8, 2007 KR 10-0947104 B1 ("PUNCHING DEVICE") published on Mar. 10, 2010

SUMMARY

An embodiment of the present invention is directed to providing a boring system and a boring method that may prevent gas inside a main pipe from leaking at the time of boring working through a specials tube having a boring tap embedded therein and a boring apparatus that adjusts separation and coupling of the boring tap.

In one general aspect, a specials tube for connecting a primary pipe and another pipe includes: a main pipe having one end coupled to an outer surface of the primary pipe and having a length formed outside of the primary pipe in a diameter direction; a branch pipe branched from the main pipe; and a boring tap disposed at the other end of the main pipe, wherein a boring hole is formed on an outer surface of the main pipe by adjusting the boring tap in a state where the main pipe is sealed.

The specials tube may further include a fixing end fixed to an inside of the other end of the main pipe, wherein an inner circumferential surface of the fixing end and an outer circumferential surface of the boring tap may each be threaded and screw-coupled with each other.

The specials tube may further include a stopper detachably coupled to the other end of the main pipe, wherein an inner circumferential surface of the stopper and an outer circumferential surface of the main pipe are threaded and screw-coupled to each other and the stopper may seal the other end of the main pipe.

In another general aspect, a boring system using a specials tube having the boring tap embedded therein described above includes: a boring apparatus including a connecting member detachably coupled to the other end of the main pipe and a control member detachably coupled to the boring tap, wherein the control member of the boring apparatus is coupled to the boring tap to form a bore in the main pipe.

Here, a first insertion recess with a thread may be provided at a central portion of an upper surface of the boring tap, and a thread corresponding to the thread of the first insertion recess may be provided at a lower end of the control member, so that the control member and the boring tap may be screw-coupled.

An insertion protrusion may be provided at a lower end of the control member and a second insertion recess may be provided on a bottom surface of the first insertion recess, so that the insertion protrusion may be inserted into the second insertion recess.

A thread may be provided on an outer circumferential surface of the boring tap, and when the control member and the boring tap coupled to each other rotate together, the boring tap may be separated from the main pipe.

The boring apparatus may further include a unit for detecting leakage of a fluid in a direction of the other end of the main pipe.

The connecting member may be provided to surround the outside to seal the other end opening of the main pipe, and the boring apparatus may rotate on the connecting member.

In another general aspect, a boring method of a primary pipe using the boring system includes: a first coupling operation of coupling a specials tube having a boring tap embedded therein to the primary pipe; a second coupling operation of coupling the connecting member and the main pipe to each other and coupling the control member and the boring tap to each other; a third coupling operation of separating the boring tap from the main pipe; a first boring operation of moving the boring tap in a direction of one end inside the main pipe to form a boring hole on the primary pipe; a second boring operation of moving the boring tap in a direction of the other end from inside the main pipe; a first separation operation of coupling the boring tap to the main pipe; and a second separation operation of separating the control member from the boring tap and separating the connecting member from the main pipe.

The specials tube having a boring tap embedded therein may further include: a stopper sealing the other end of the main pipe, wherein the boring method further includes: a sealing operation of coupling the stopper to the other end of the main pipe after the second separation operation.

The second coupling operation may include rotating the control member in one direction so as to be coupled to the boring tap, and the third coupling operation may include rotating the control member and the boring tap together in one direction so as to be separated from the main pipe.

Other features and aspects will be apparent from the following detailed description, the drawings, and the claims.

BRIEF DESCRIPTION OF THE DRAWINGS

FIGS. 6A and 6B are a perspective view of a boring apparatus according to an embodiment of the present invention.

DETAILED DESCRIPTION OF EXEMPLARY EMBODIMENTS

Hereinafter, a specials tube having a boring tap embedded therein and a boring method using the same according to various embodiments of the present invention will be described in detail with reference to the accompanying drawings. The drawings introduced below are provided as examples in order to sufficiently convey the spirit of the present invention to those skilled in the art. Therefore, the present invention is not limited to the drawings presented below and may be embodied in other forms. In addition, the same reference numbers throughout the specification indicate the same components.

Unless there are other definitions in the technical terms and scientific terms used, the technical terms and scientific terms used in the present specification have the general meaning understood by those skilled in the art to which the present invention pertains, and in the following description and accompanying drawings, descriptions of well-known functions and configurations that may unnecessarily obscure the subject matter of the present invention are omitted.

First Embodiment

[Boring System]

Figure 1:
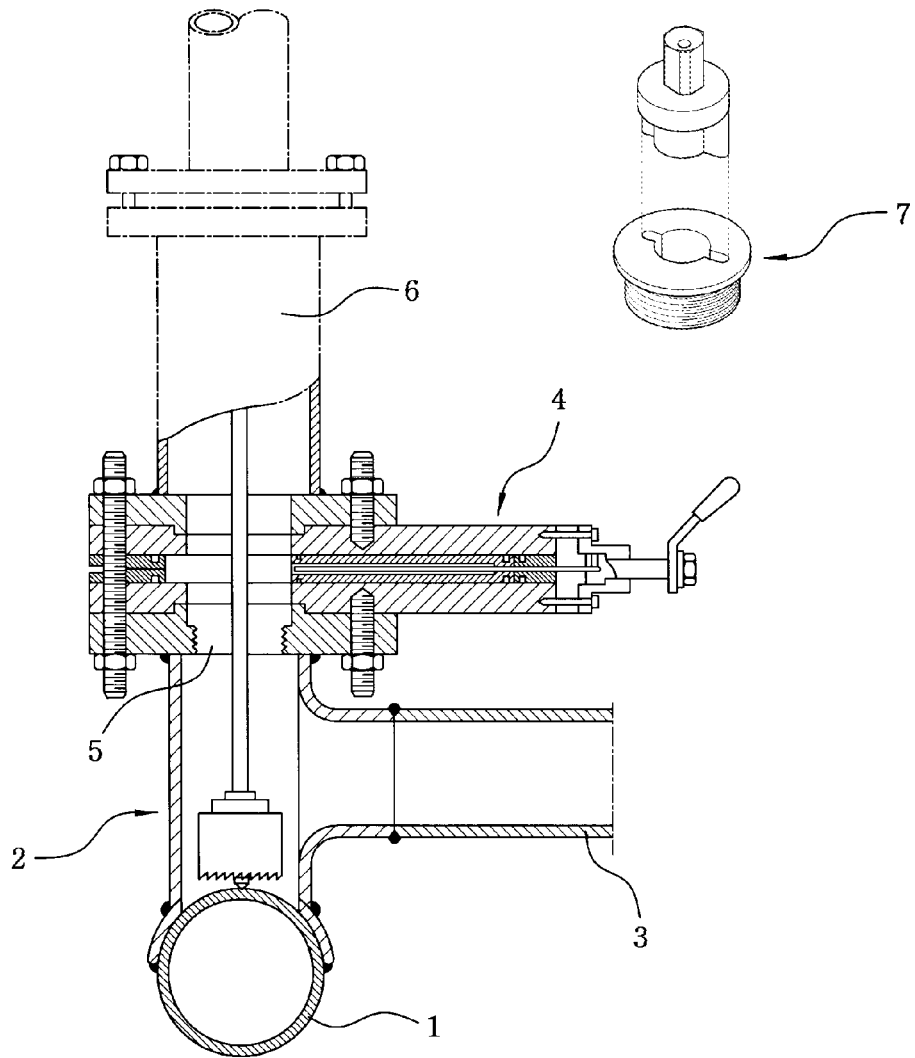
FIG. 1 is a front cross-sectional view illustrating a boring system according to the related art.
Figure 2:
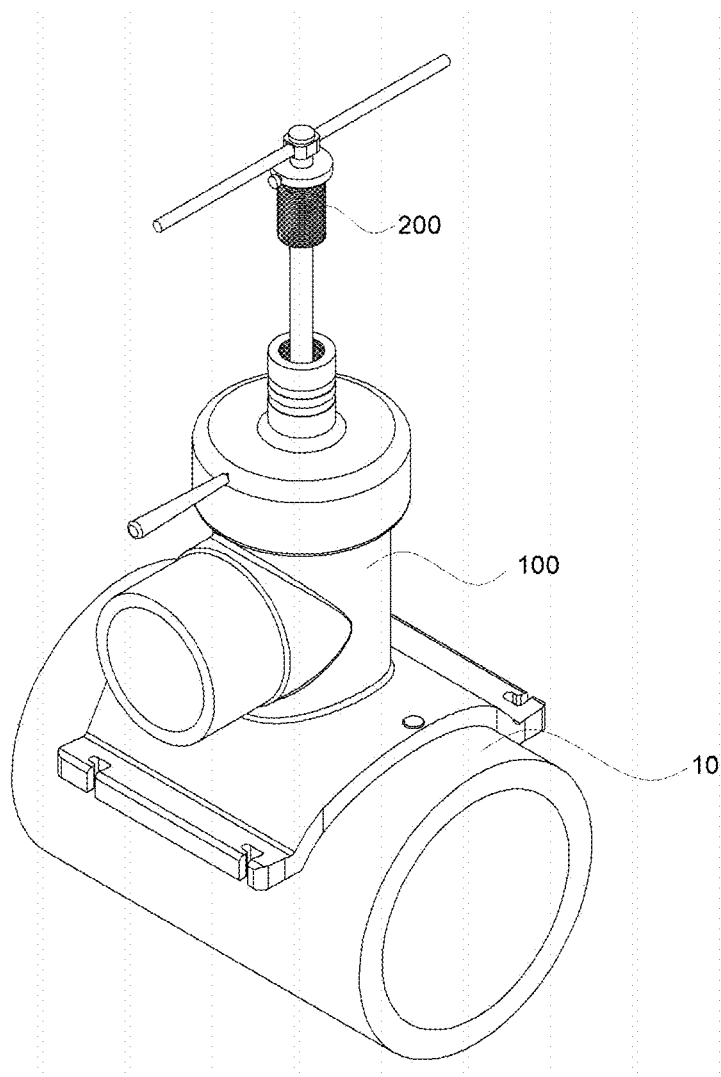
FIG. 2 is a perspective view of a specials tube and a boring apparatus according to an embodiment of the present invention.
Figure 3:
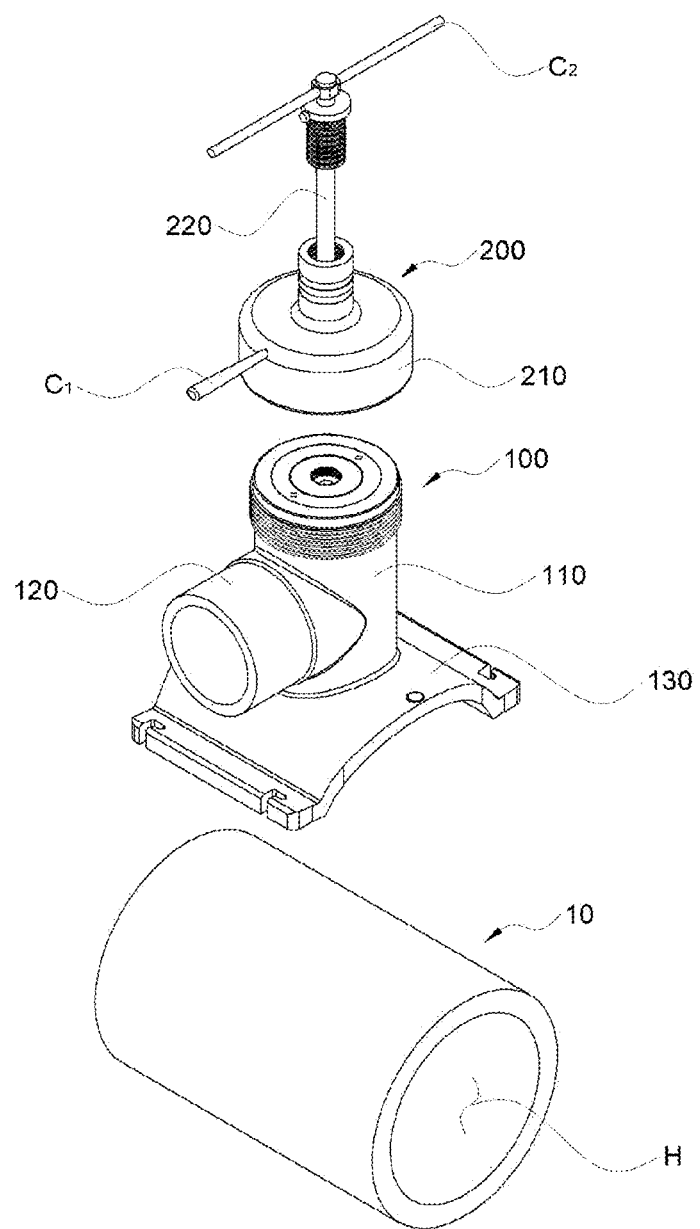
FIG. 3 is an exploded perspective view of the specials tube and the boring apparatus according to an embodiment of the present invention.

FIGS. 2 and 3 relate to an example of a boring system, in which FIG. 2 is a perspective view of a specials tube and a boring apparatus and FIG. 3 is an exploded perspective view of the specials tube and a boring apparatus.

First, referring to FIG. 2, a boring system of the present invention may include a primary pipe 10 in which a fluid flows, a specials tube 100 fused to the primary pipe 10 and transferring a gas in the primary pipe 10 to another pipe, and a boring apparatus 200 detachably coupled to the specials tube 100 to form a boring hole on the primary pipe 10. Each component will be described in more detail with reference to FIG. 3 hereinafter.

The primary pipe 10 may have a through hole H provided therein, and a fluid may flow in the through hole H. Here, the primary pipe 10 may have various cross-sectional shapes and may extend in a longitudinal direction. Here, when the primary pipe 10 has a cylindrical shape with the through hole H as shown, the primary pipe 10 may have an outer diameter and an inner diameter.

The specials tube 100 may be coupled to an outer circumferential surface of the primary pipe 10 and may include a main pipe 110 and a branch pipe 120. In addition, the specials tube 100 may further include a fastening plate 130 for fastening with the primary pipe 10. Each of the main pipe 110 and the branch pipe 120 may have a pipe shape with a hollow, and the main pipe 110 may be provided such that one end thereof is adjacent to the outer circumferential surface of the primary pipe 10 and the other end thereof in a longitudinal direction is disposed outside the primary pipe 10 in a diameter direction. The branch pipe 120 is provided at a position between one end and the other end of the main pipe 110 and extend in length in a direction different from the longitudinal direction of the main pipe 110.

The boring apparatus 200 may include a connecting member 210 coupled to the other end of the main pipe 110 and detachably coupled to the main pipe 110 and a control member 220 rotatably coupled to the connecting member 210 and detachably coupled to a boring tap embedded in the main pipe 100 as described hereinafter. The connecting member 210 and the control member 220 may include a first adjusting portion C1 and a second adjusting portion C2, respectively, and the first adjusting portion C1 and the second adjusting portion C2 may be provided to transfer power to the connecting member 210 and the control member 220.

Figure 4:
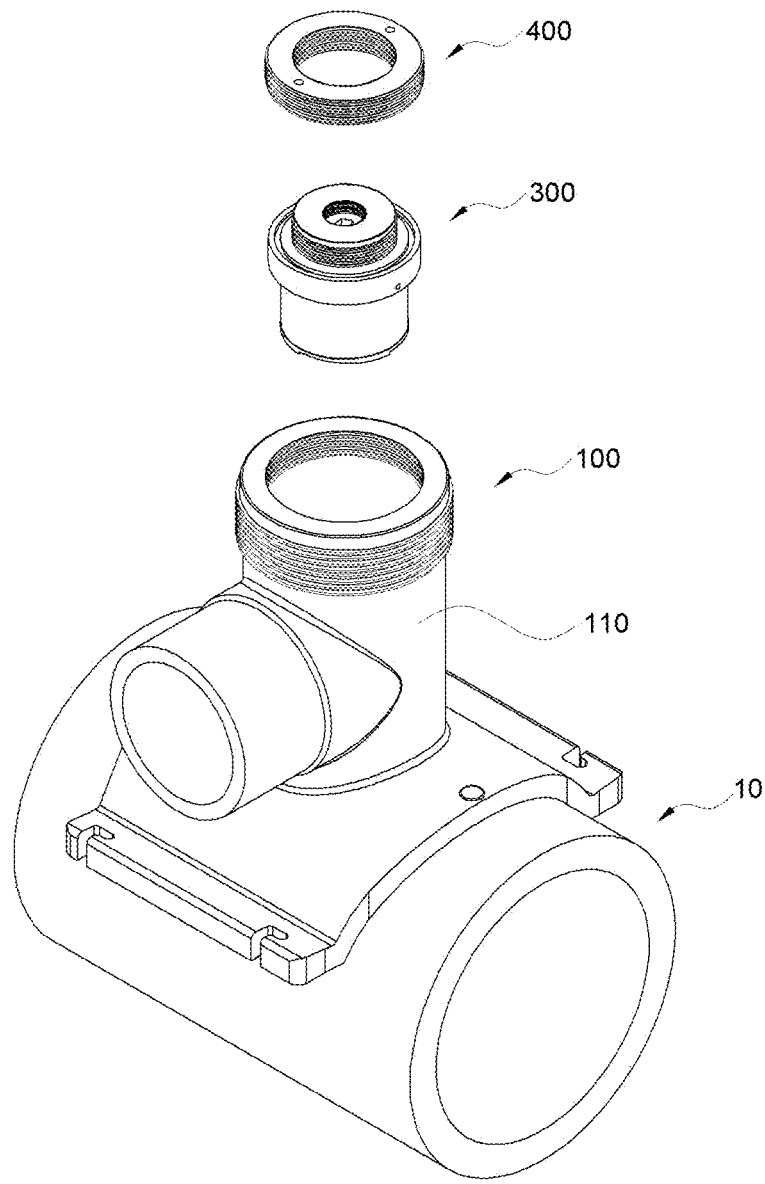
FIG. 4 is an exploded perspective view of the specials tube according to an embodiment of the present invention.
Figure 5:
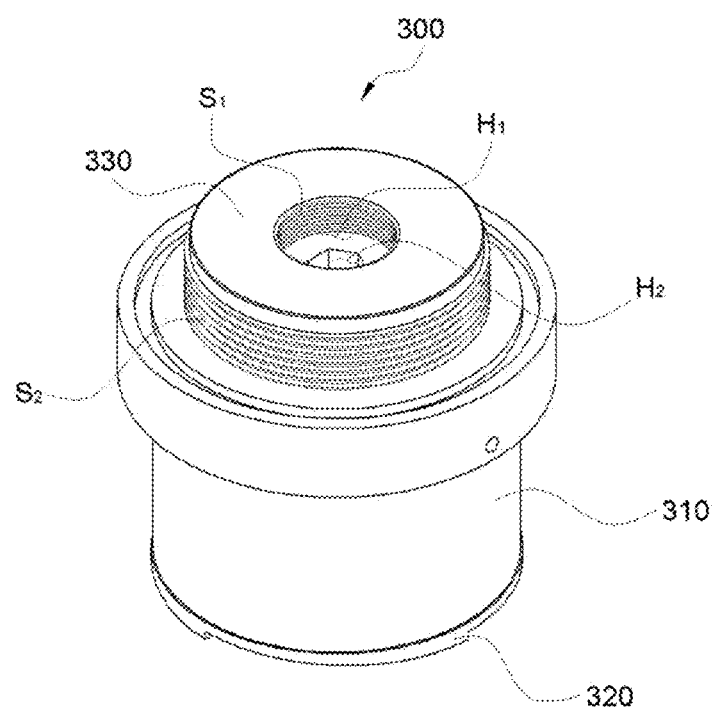
FIG. 5 is a perspective view of a boring tap according to an embodiment of the present invention.

FIGS. 4 and 5 relate to an example of a boring system of an embodiment of the present invention. Specifically, FIG.

4 is an exploded perspective view of a specials tube and FIG. 5 is a perspective view of a boring tap.

Referring to FIG. 4, first, the boring system of the present invention may further include a fixing end 400 provided to allow the boring tap 300 to be embedded in the main pipe 110 of the specials tube 100 and fixing the boring tap 300 to the main pipe 110. The fixing end 400 may be integrally or detachably coupled with the main pipe 110, and when detachably coupled, an outer circumferential surface thereof may have a thread and coupled with a thread provided on the inner circumferential surface of the main pipe 110. A hollow may be provided in the fixing end 400 to allow part of the boring tap 300 to be inserted and fixed therein. The boring tap 300 will be described in detail with reference to FIG. 5.

The boring tap 300 may include a tap body 310, a boring tip 320, and a fastening body 330. Here, the boring tip 320 may be provided in a cutter shape to form a boring hole in the primary pipe 10 described above, and the fastening body 330 may be provided to be inserted and fixed in the hollow of the fixing end 400 described above. In addition, the boring tip 320 and the fastening body 330 may be provided at opposing ends of the tap body 310, respectively, and the boring tip 320 may be provided to be relatively closer to the primary pipe 10 than the fastening body 330. Here, for clarification, one end of the main pipe 100 will be referred to as a lower side and the other end will be referred to as an upper side.

The fastening body 330 provided on the top of the tap body 310 may have a first insertion recess H1. In addition, a first coupling portion S1 and a second coupling portion S2 may be provided in a fastenable form such as a thread, respectively, on an inner circumferential surface of the first insertion recess H1 and an outer circumferential surface of the fastening body 330. Here, the first coupling portion S1 may be coupled to the fixing end 400 described above and the second coupling portion S2 may be coupled with the control member 220 of the boring apparatus 200 described above. An outer diameter of the fastening body 330 may be smaller than an outer diameter of the tap body 310 and may correspond to an inner diameter of the fixing end 400. In addition, a second insertion recess H2 having a relatively small inner diameter may be further provided on a lower surface which is the innermost side of the first insertion recess H1 of the fastening body 330.

Figure 6B:
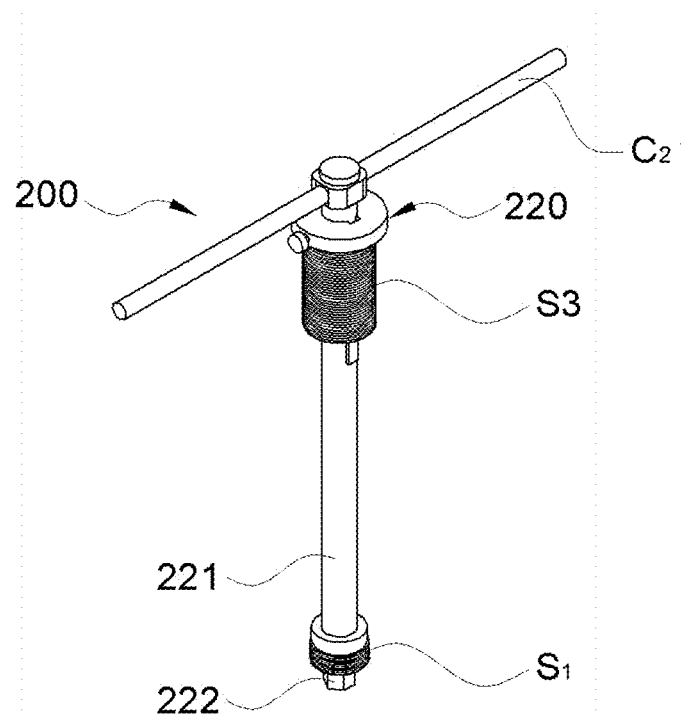
Figure 7:
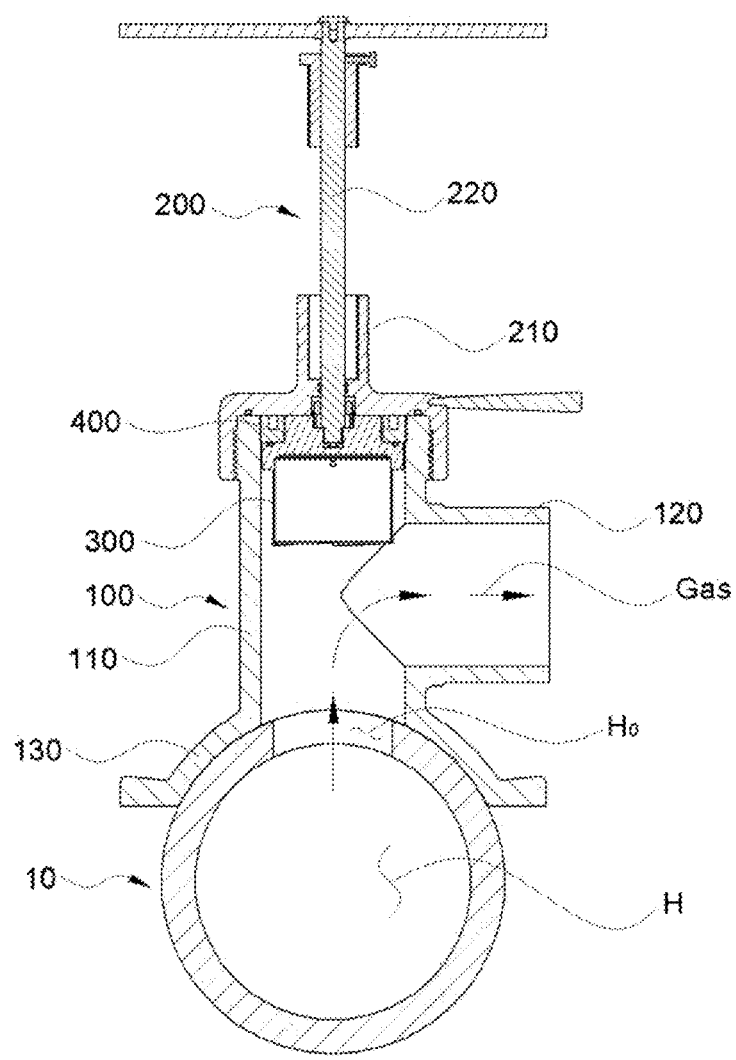
FIG. 7 is a side cross-sectional view of a side surface of FIG. 2 according to an embodiment of the present invention.
Figure 8:
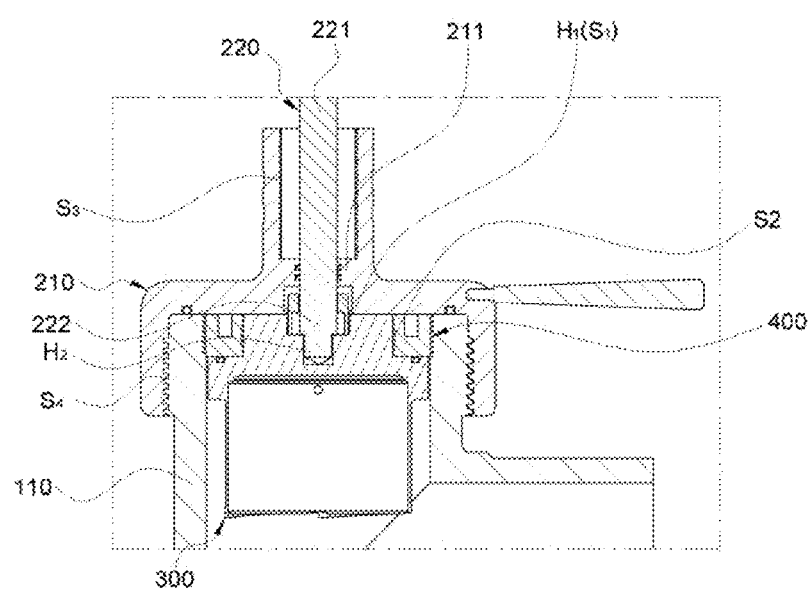
FIG. 8 is a partial enlarged view of a main portion of FIG. 7 according to an embodiment of the present invention.

FIGS. 6A to 8 relate to an example of a boring system of the present invention. Specifically, FIGS. 6A and 6B are a perspective view of a boring apparatus, FIG. 7 is a side cross-sectional view of the side of FIG. 2, and FIG. 8 is an enlarged view of a main portion of FIG. 7.

Referring to FIG. 6A, first, the boring apparatus 200 may include the connecting member 210 and the control member 220 as described above. Here, the connecting member 210 may have a multi-stage cylindrical shape having different diameters. In addition, the connecting member 210 may have a hollow so that the control member 220 may be movable up and down on the hollow. In addition, a third coupling portion S3 may be provided on the hollow of the connecting member 210, and a corresponding third coupling portion S3 may be provided at an upper end of the control member 220 so that the primary pipe may be bored using a greater rotational force during a boring operation.

Next, referring to FIG. 6B, the control member 220 may include a body portion 221 whose length is vertically formed. In addition, a first coupling portion S1 may be provided at a lower end of the body portion 221 and fastened with the first coupling portion S1 provided on the inner circumferential surface of the fastening body 330 of the boring tap 300. In addition, an insertion protrusion 222 may be provided to protrude from a lower side of the lower end of the body portion 221, and the insertion protrusion 222 may be seated on the second insertion recess H2 of the boring tap 300 described above.

A combination of the boring system by such components will be described in more detail with reference to FIG. 7. FIG. 7 illustrates a state in which a boring hole $H_0$ is formed in a region of the primary pipe 10 in which the specials tube 100 is installed after a boring operation on the primary pipe 10 is completed. A fluid such as a gas or the like flowing in the primary pipe 10 may flow to another pipe separately coupled to the branch pipe 120 through the boring hole $H_0$, the main pipe 110, and the branch pipe 120.

The fixing end 400 may be disposed on the top of the hollow of the main pipe 110, and the boring tap 300 may be detachably coupled to the fixing end 400. In addition, the control member 220 of the boring apparatus 200 may also be detachably coupled to the boring tap 300. Here, the boring system may be provided such that the boring tap 300 is separated from the fixing end 400 in a state in which the control member 220 is mounted with the boring tap 300 or such that the control member 220 is separated when the boring tap 300 is mounted at the fixing end 400, so that the boring tap 300 may be selectively coupled to the control member 220 or the fixing end 400.

The connecting member 210 of the boring apparatus 200 may be provided to surround an upper end of the main pipe 110 to prevent the fluid in the main pipe 110 from being leaked to the outside during the boring operation. This sealed coupling structure will be described in more detail in FIG. 8.

As shown in FIG. 8, in the boring system of the present invention, an outer diameter of an upper end of the main pipe 110 may correspond to an inner diameter of a lower end of the connecting member 210, and a fourth coupling portion S4 may be provided and coupled to each of an outer circumferential surface of the upper end of the main pipe 110 and an inner circumferential surface of the lower end of the connecting member 210.

A first insertion recess H1 and a second insertion recess H2 are provided at an upper portion of the boring tap 300, and a lower end of the body portion 221 of the control member 220 and an insertion protrusion 222 may be inserted into the first insertion recess H1 and the second insertion recess H2, respectively. Here, a first coupling portion S1 may be provided and fastened to the inner circumferential surface of the first insertion recess H1 and to the lower end of the body portion 221.

In addition, as described above, the third coupling portion S3 may be provided in the hollow of the upper end of the connecting member 210, and a limiting portion 211 protruding inward may be provided in the hollow adjacent to a central portion of the connecting member 210. The limiting portion 211 may have a diameter smaller than a diameter of the hollow, and the corresponding diameter may correspond to an outer diameter of the body portion 221 of the control member 220. Also, a sealing unit such as a gasket may be provided on the limiting portion 211, and when the control member 220 is moved downward, the body portion 221 and the limiting portion 211 are sealed, and thus the fluid in the main pipe 110 may be prevented from being leaked to the outside.

A second coupling portion S2 may be provided on an outer circumferential surface of an upper portion of the boring tap 300 coupled with the fixing end 400, and the boring tap 300 may be selectively coupled to the control member 220 and the fixing end 400 through the first coupling portion S1 and the second coupling portion S2. Such a fastening method will be described in a boring method described hereinafter.

[Boring Method]

FIGS. 9A to 13B relate to an example of a method of boring a primary pipe of the present invention, and FIGS. 9A to 13B sequentially show a boring method.

Figure 9A:
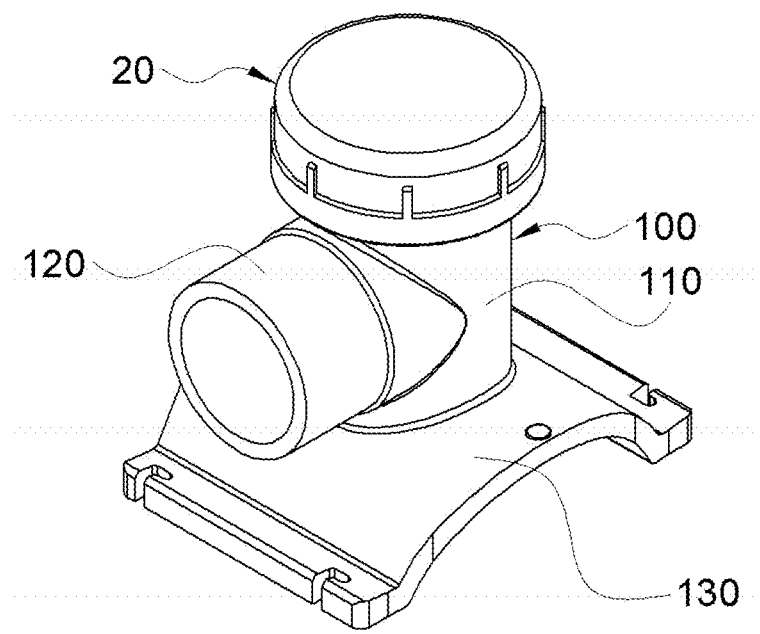
FIGS. 9A to 13B are construction illustrative views sequentially illustrating a boring method according to an embodiment of the present invention.
Figure 9B:
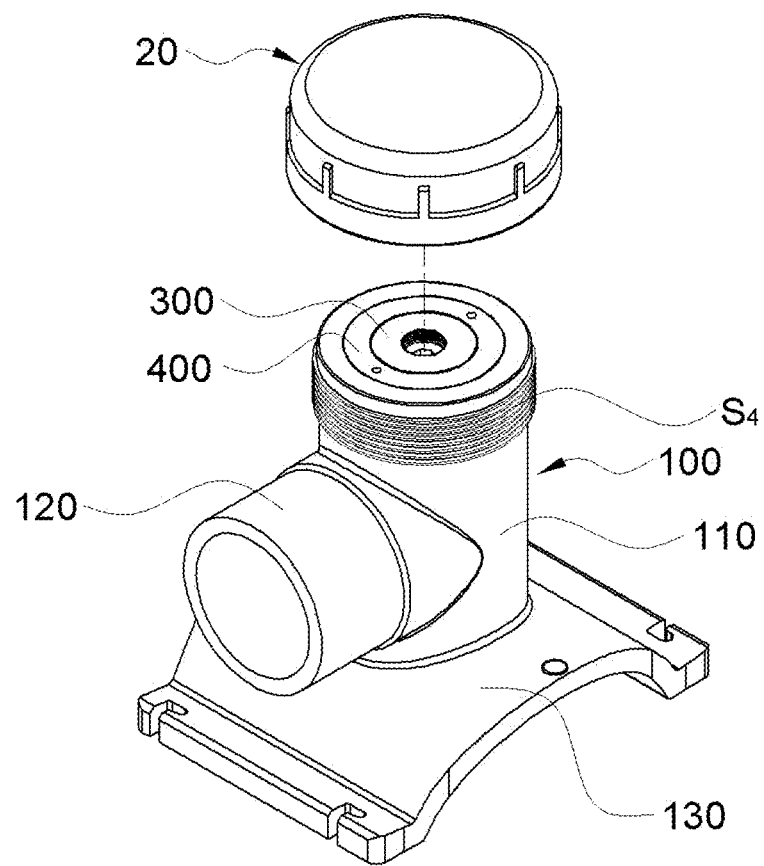

Before explaining FIGS. 9A and 9B, the method of boring a main pipe may include a first coupling operation S110 of fastening the specials tube 100 equipped with the boring tap 300 to the primary pipe 10. Here, the first coupling operation S110 may include an operation of connecting another pipe to the branch pipe 120 of the specials tube 100.

In case where the stopper 20 is included in the specials tube 100 of the present invention, an operation of separating the stopper 20 from the specials tube 100 as sequentially shown in FIGS. 9A and 9B may be included. More specifically, in a state where the stopper 20 is mounted to seal the other end of the main pipe 110 of the specials tube 100, the stopper 20 may be separated from the other end of the main pipe 110.

Figure 10A:
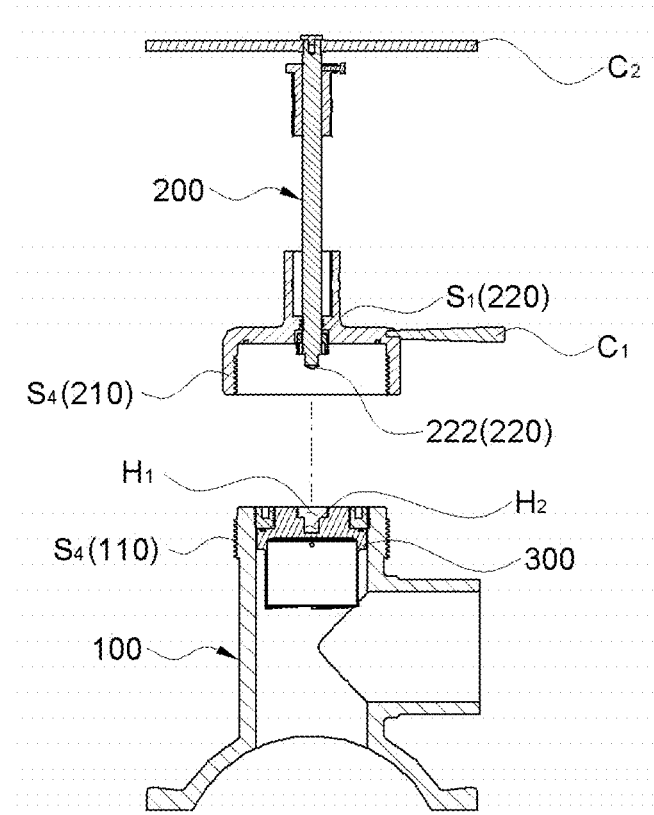
Figure 10B:
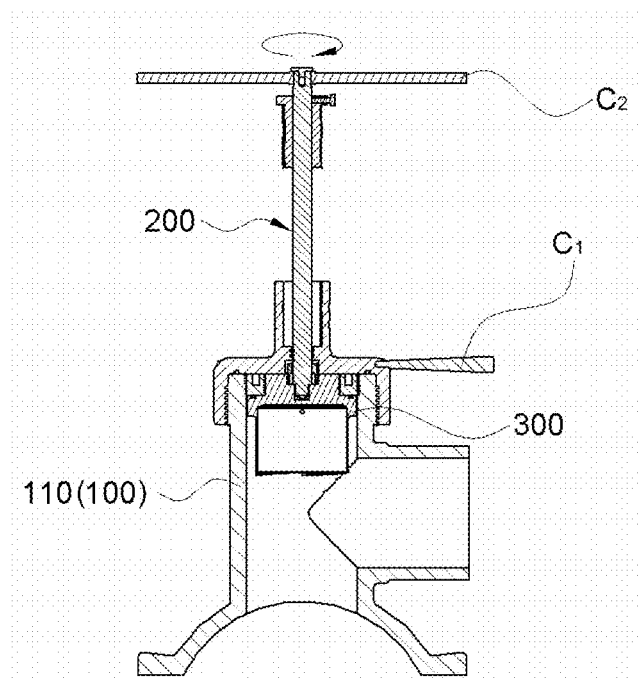

Thereafter, as shown in FIG. 10A and FIG. 10B, the boring method of the present invention may include a second coupling operation of coupling the connecting member 210 of the boring apparatus 200 with the main pipe 110 and coupling the control member 220 of the boring apparatus 200 with the boring tap 300. Here, the connecting member 210 may fasten the fourth coupling portion S4 provided in the hollow at the lower end and the fourth coupling portion S4 provided on the outer circumferential surface at the upper end of the main pipe 110. The control member 220 may cause the insertion protrusion 222 to be seated in the second insertion recess H2 of the fastening tap 300 and fasten the first coupling portion S1 provided on the outer circumferential surface at the lower end of the body portion 221 and the first coupling portion S1 of the first insertion recess H1 of the fastening tap 300 to each other. Here, if the first coupling portion S1 and the fourth coupling portion S4 have a thread, the first coupling portion S1 and the fourth coupling portion may be fastened by applying a rotational force to the first adjusting portion C1 and the second adjusting portion C2 provided in the connecting member 210 and the control member 220, respectively.

Figure 11A:
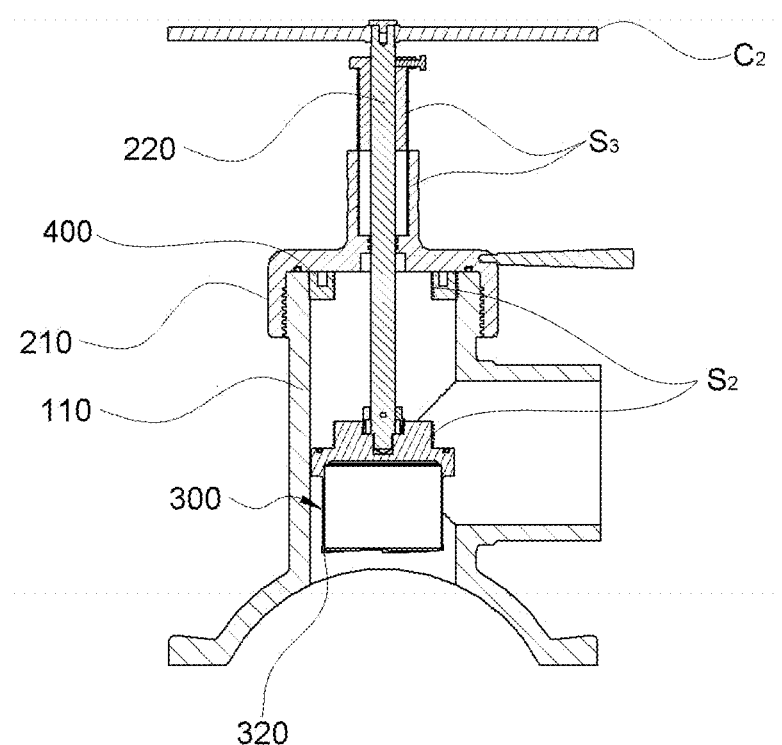

In addition, the boring method of the present invention may include a third coupling operation S130 in which when the control member 220 rotates in one direction and is fastened to the fastening tap 300 through the first coupling portion S1, the control member 220 and the fastening tap 300 rotate in one direction together so as to be separated from the second coupling portion S2 of the fixed end 400 as shown in FIG. 11A.

Figure 11B:
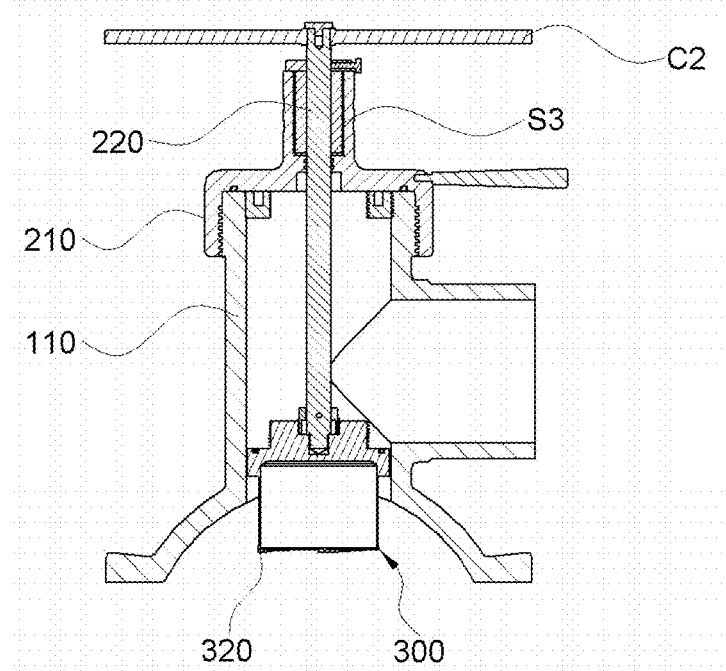

As shown in FIGS. 11A and 11B, the boring method of the present invention may include a first boring operation S210 in which the control member 220 descends together with the fastening tap 300 to form a boring hole on the primary pipe (not shown) disposed on a lower side. Here, in the first boring operation S210, the third coupling portion S3 provided in the control member 220 and the third coupling portion S3 provided in the connecting member 210 may be screw-coupled to perform boring through the boring tip 320 of the boring tap 300, and accordingly, the boring operation may be efficiently performed.

Figure 12A:
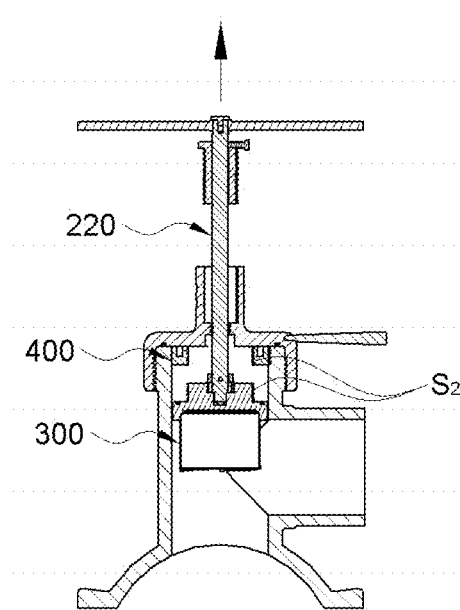

Thereafter, as shown in FIG. 12A, the boring method of the present invention may include a second boring operation S220 in which the control member 220 and the boring tap 300 rise together. In addition, the boring method of the present invention may include a first separation operation S310 in which the control member 220 and the boring tap 300 rotate in different directions so that the second coupling portion S2 provided at the upper end of the boring tap 300 and the second coupling portion S2 provided on the inner circumferential surface of the fixing end 400 are fastened to each other.

Figure 12B:
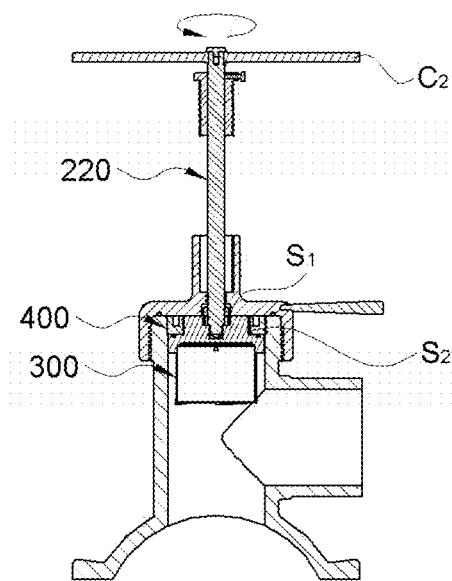
Figure 12C:
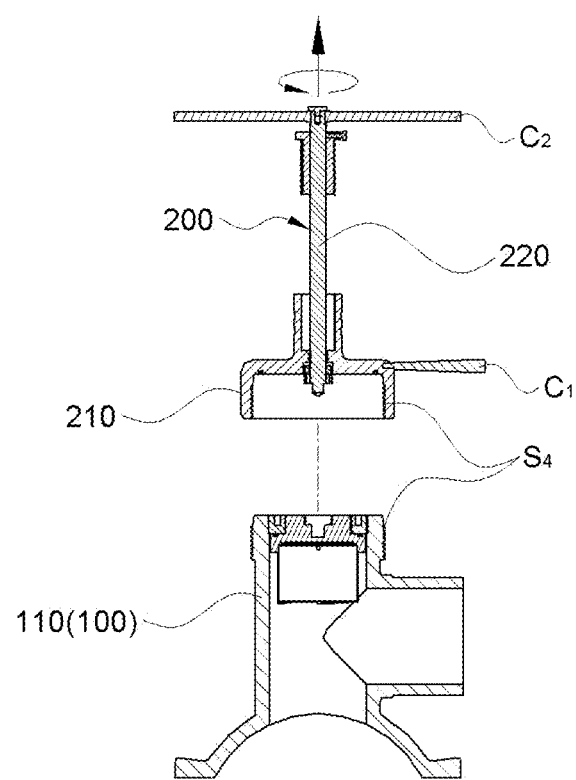

And as shown in FIGS. 12B and 12C, the boring method of the present invention may include a second separation operation S320 in which the control member 220 is separated from the boring tap 300 and the connecting member 210 is separated from the main pipe 110. Here, in the second separation operation S320, when the boring tap 300 and the fixing end 400 are completely fastened, only the control member 220 may rotate in a different direction to be separated from the boring tap 300. Here, the upper end of the main pipe 110 may be sealed through the boring tap 300 and the fixing end 400.

Figure 13A:
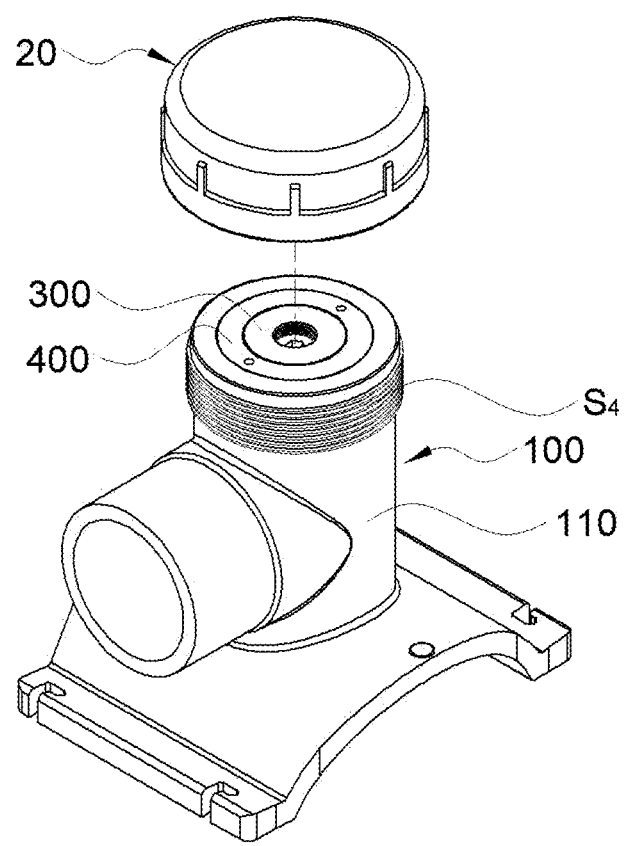
Figure 13B:
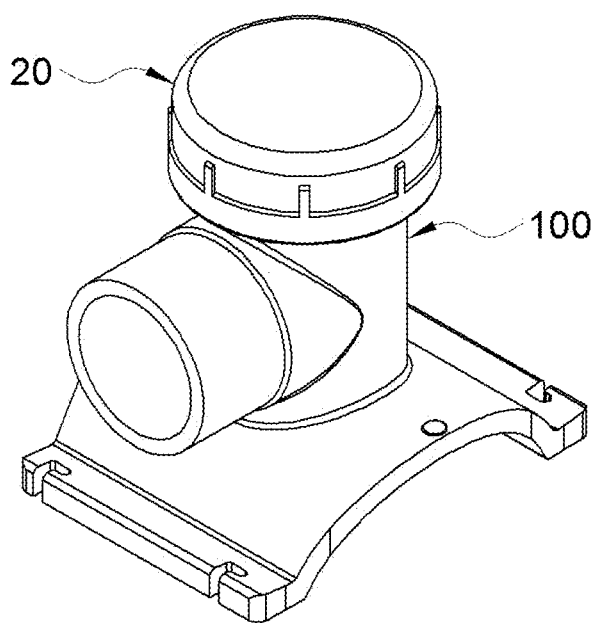

Next, as shown in FIGS. 13A and 13B, the boring method of the present invention may further include a sealing operation S400 of fastening the stopper 20 to the upper end of the main pipe 110, and here, an inner diameter of a lower end portion of the stopper 20 may correspond to an upper end portion of the main pipe 110 and a fourth coupling portion S4 may also be provided on an inner circumferential surface of the lower end portion of the stopper 20 so as to be screw-coupled to each other. Accordingly, the specials tube 100 of the present invention may be safer and may be used for a long period of time because the opening at the upper end may be first sealed through the boring tap 300 and the fixing end 400 and secondly sealed through the stopper 20.

Second Embodiment

Figure 14:
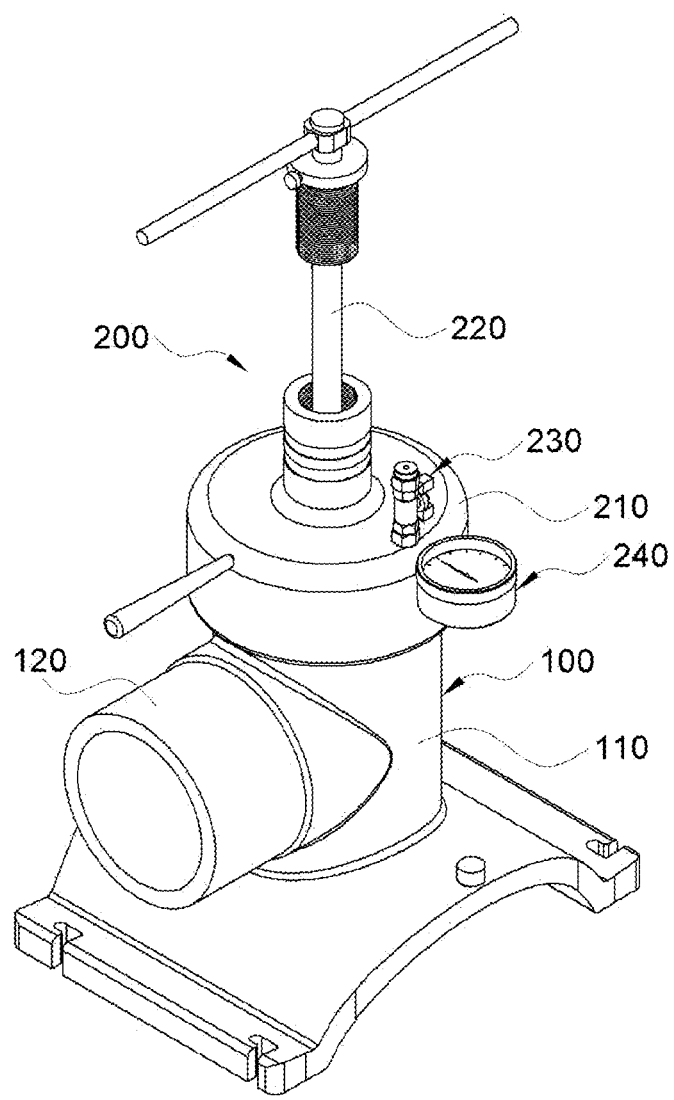
FIG. 14 is a perspective view of a specials tube and a boring apparatus according to another embodiment of the present invention.

FIG. 14 relates to another exemplary embodiment of a boring system of the present invention. Specifically, FIG. 14 is a perspective view of a specials tube and a boring apparatus.

Referring to FIG. 14, the boring system of the present invention may further include a unit for detecting leakage of a fluid toward the opening at the upper end of the main pipe 110 during a boring operation. Here, the detecting unit may check sealing performance of the boring tap 300 and the fixing end 400 fastened to the upper end of the main pipe 110 described above and determine whether the fluid is leaked after the boring hole is formed on the primary pipe and before the boring apparatus 200 is separated from the main pipe 110. Accordingly, in the present invention, safety of a worker may be secured if an ignitable or toxic material flows in the pipe. Here, the unit for detecting leakage of the fluid may include a detection valve 230, a pressure gauge 240, and the like, and a separate sensor may be further provided. Here, the detection unit may be installed on the connecting member 210 and may detect a portion between the inside of the connecting member 210 and the upper end of the main pipe 110 in real time.

In the specials tube having the boring tap embedded therein and the boring method using the same according to the present invention having the configuration as described above, the boring tap coupled to the specials tube is formed to be separated and coupled to the boring apparatus together with the coupling of the boring apparatus and the specials tube, such that it is possible to provide a safer working environment by preventing fluid from leaking to the outside after forming the boring. That is, according to the present invention, since it is possible to prevent gas leakage together with the reduction of construction labor cost and construction time, there is an advantage that construction may be made more quickly while being safer.

Further, according to the present invention, since a connecting member of the boring apparatus surrounds the outside of the opening of the specials tube, and a control member coupled to the boring tap is formed on the connecting member to allow reciprocating motion, there is an advantage that the boring working is more easily performed in addition to preventing the fluid from leaking.

In addition, according to the present invention, since it is possible to test an air-tightness performance of the boring tap coupled to the specials tube in the situations after the boring is performed and before the boring apparatus is separated by means of detecting the leakage of fluid, such as a detection valve or a pressure gauge formed on the boring apparatus, it is possible to prevent accidents in advance.

In addition, according to the present invention, as the boring apparatus is embedded inside the specials tube, there is an advantage that a larger boring hole may be formed in the primary pipe compared with the conventional apparatus. Since conventional apparatuses had to be equipped with a gate valve and a separate sealing means on an upper side of the specials tube, a boring hole of a 450 (pie) was the limit, but according to the present invention, as the boring apparatus is equipped inside the specials tube, there is an advantage that the boring hole may be formed up to a size of an inner diameter of the specials tube with respect to the primary pipe. For example, according to the present invention, there is an advantage of providing a size of the boring hole limited to a maximum of 45ø up to 130ø with respect to the primary pipe.

Further, according to the present invention, since a first adjusting portion and a second adjusting portion are formed on the boring apparatus and the fastening with the specials tube or the coupling/separation with the boring tap is possible through a manipulation of the first adjusting portion and the second adjusting portion, there is an advantage of being able to perform the boring working on the main pipe with fewer people. Accordingly, for a boring working that conventionally requires a plurality of persons of two people or more, according to the present invention, there is an advantage that the boring on the main pipe is possible even with one worker.

Hereinabove, although the present invention is described by specific matters, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described embodiments, and the following claims as well as all modified equally or equivalently to the claims are intended to fall within the scope and spirit of the invention.

DETAILED DESCRIPTION OF MAIN ELEMENTS

| C1: first adjusting portion | C2: second adjusting unit |
|---|---|
| S1: first coupling portion | S2: second coupling portion |
| S3: third coupling portion | S4: fourth coupling portion |
| H: through hole | H0: boring hole |
| H1: first insertion recess | H2: second insertion recess |
| 10: primary pipe | 20: stopper |
| 100: specials tube | 110: main pipe |
| 120: branch pipe | 130: fastening plate |
| 200: boring apparatus | |
| 210: connecting member | 211: limiting portion |
| 220: control member | |
| 221: body portion | 222: insertion protrusion |
| 230: detection valve | 240: pressure gauge |
| 300: boring tap | |
| 310: tap body | 320: boring tip |
| 330: fastening body | |
| 400: fixing end | |

What is claimed is:

1. A boring system for connecting a primary pipe and another pipe, the boring system comprising:
a main pipe having one end coupled to an outer surface of the primary pipe and having a length formed outside of the primary pipe in a diameter direction;
a branch pipe branched from the main pipe; and
a boring tap disposed at the other end of the main pipe,
a fixing end fixed to an inner circumferential surface of the other end of the main pipe and having a hollow of which inner diameter is smaller than that of the main pipe; and
a boring apparatus including a connecting member detachably coupled to an outer circumferential surface of the other end of the main pipe and a control member detachably coupled to the boring tap,
wherein an inner circumferential surface of the fixing end and an outer circumferential surface of the boring tap each are threaded and screw-coupled with each other,
a first insertion recess with a thread is provided at the boring tap, and a thread corresponding to the thread of the first insertion recess is provided at a lower end of the control member, and
wherein when the control member and the boring tap coupled to each other rotate together, the outer circumferential surface of the boring tap is separated from the inner circumferential surface of the fixing end so that the boring tap is moved in a direction of one end inside the main pipe.

2. The boring system of claim 1, further comprising:
a stopper detachably coupled to the other end of the main pipe,
wherein an inner circumferential surface of the stopper and an outer circumferential surface of the main pipe are threaded and screw-coupled to each other and the stopper seals the other end of the main pipe.

3. The boring system of claim 1, wherein
an insertion protrusion is provided at a lower end of the control member and a second insertion recess is provided on a bottom surface of the first insertion recess, so that the insertion protrusion is inserted into the second insertion recess.

4. The boring system of claim 1, wherein
the boring apparatus further includes a unit for detecting leakage of a fluid in a direction of the other end of the main pipe.

5. The boring system of claim 1, wherein
the connecting member is provided to surround the outside to seal the other end of the main pipe, and the control member rotates on the connecting member.

6. A boring method of a primary pipe using the boring system of claim 1, the boring method comprising:

a first coupling operation of coupling a specials tube having a boring tap embedded therein to the primary pipe;

a second coupling operation of coupling the connecting member and the main pipe to each other and coupling the control member and the boring tap to each other;

a third coupling operation of separating the boring tap from the main pipe;

a first boring operation of moving the boring tap in a direction of one end inside the main pipe to form a boring hole on the primary pipe;

a second boring operation of moving the boring tap in a direction of the other end from inside the main pipe;

a first separation operation of coupling the boring tap to the main pipe; and a second separation operation of separating the control member from the boring tap and separating the connecting member from the main pipe.

7. The boring method of claim 6, wherein the specials tube having a boring tap embedded therein further includes a stopper sealing the other end of the main pipe, wherein the boring method further comprising:

a sealing operation of coupling the stopper to the other end of the main pipe after the second separation operation.

8. The boring method of claim 6, wherein the second coupling operation includes rotating the control member in one direction so as to be coupled to the boring tap, and the third coupling operation includes rotating the control member and the boring tap together in one direction so as to be separated from the main pipe.

* * * * *